US009911373B2

(12) United States Patent
Nakagoshi

(10) Patent No.: US 9,911,373 B2
(45) Date of Patent: Mar. 6, 2018

(54) IMAGE PROCESSING APPARATUS AND DISPLAY DETERMINATION METHOD

(71) Applicant: JVC KENWOOD Corporation, Yokohama-shi, Kanagawa (JP)

(72) Inventor: Ryosuke Nakagoshi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/245,528

(22) Filed: Aug. 24, 2016

(65) Prior Publication Data

US 2017/0061848 A1 Mar. 2, 2017

(30) Foreign Application Priority Data

Aug. 31, 2015 (JP) .................................. 2015-170952

(51) Int. Cl.
*G06T 7/00* (2017.01)
*G09G 3/20* (2006.01)
*G09G 5/02* (2006.01)
*G06T 7/40* (2017.01)

(52) U.S. Cl.
CPC ........... *G09G 3/2003* (2013.01); *G06T 7/408* (2013.01); *G09G 5/02* (2013.01); *G09G 2320/0242* (2013.01); *G09G 2320/0276* (2013.01); *G09G 2340/06* (2013.01)

(58) Field of Classification Search
None
See application file for complete search history.

(56) References Cited

U.S. PATENT DOCUMENTS

| 2006/0209320 A1* | 9/2006 | Ariga ................... H04N 1/6058 358/1.9 |
| 2010/0027884 A1* | 2/2010 | Han ......................... H04N 9/77 382/167 |
| 2014/0340434 A1* | 11/2014 | El-Ghoroury ........ G09G 3/3607 345/690 |

FOREIGN PATENT DOCUMENTS

JP 2013225802 A * 10/2013

OTHER PUBLICATIONS

EIZO Corporation, Product Information, [online] [retrieved on Aug. 31, 2015] URL: URL:http://www.eizo.co.jp/products/ce/cg3184k/index.html.

* cited by examiner

*Primary Examiner* — Delomia L Gilliard
(74) *Attorney, Agent, or Firm* — Procopio, Cory, Hargreaves & Savitch LLP

(57) ABSTRACT

An image processing apparatus includes a first color gamut conversion unit that converts an input image signal in an XYZ color system into an output image signal in a linear RGB color system by using the inverse matrix of a matrix including, as its components, values obtained by normalizing XYZ values by a predetermined luminance value, the XYZ values being obtained by measuring an image for measurement displayed in a display device for which a determination is made, and a determination unit that determines, when an R, G, or B value of the output image signal is larger than a first predetermined value, that the display device cannot display an image related to the input image signal with brightness corresponding to respective luminance of the input image signal.

10 Claims, 8 Drawing Sheets

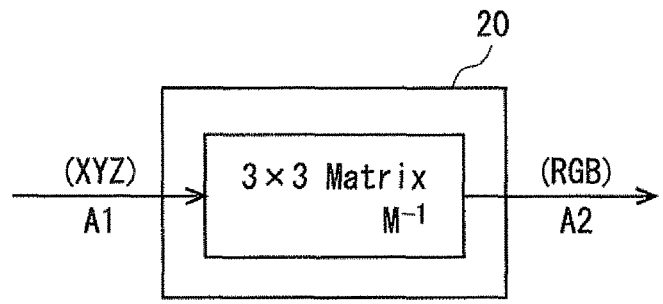

$$M = \begin{pmatrix} R_x/Yw \times YwR & R_y/Yw \times YwR & R_z/Yw \times YwR \\ G_x/Yw \times YwR & G_y/Yw \times YwR & G_z/Yw \times YwR \\ B_x/Yw \times YwR & B_y/Yw \times YwR & B_z/Yw \times YwR \end{pmatrix}$$

$Rx, Gx, Bx$ : XYZ VALUES OBTAINED BY PERFORMING XYZ MEASUREMENT ON EACH OF RGB DISPLAYED IN DISPLAY DEVICE $Yw$ : LUMINANCE VALUE OF WHITE POINT IN DISPLAY DEVICE ($=Ry+Gy+By$)

$YwR$ : RATIO BETWEEN MAXIMUM LUMINANCE VALUE OF WHITE POINT IN DISPLAY DEVICE AND MAXIMUM LUMINANCE VALUE OF WHITE POINT IN INPUT IMAGE SIGNAL

※ Xw, Yw AND Zw COEFFICIENTS ARE SET WITH PREDETERMINED RATIO WHILE FIXING Yw AT 1.0
FOR EXAMPLE, IN THE CASE OF MONOCHROME HAVING COLOR TEMPERATURE OF 6500K, THEY ARE SET AS FOLLOWS:
Xw:0.9504, Yw:1.000, Zw:1.0889

IMAGE PROCESSING APPARATUS AND DISPLAY DETERMINATION METHOD

CROSS REFERENCE TO RELATED APPLICATION

This application is based upon and claims the benefit of priority from Japanese patent application No. 2015-170952, filed on Aug. 31, 2015, the disclosure of which is incorporated herein in its entirety by reference.

BACKGROUND

The present invention relates to an image processing apparatus and a display determination method.

Currently, HDR (High Dynamic Range) contents have been becoming widespread. However, there are cases in which the color space that a display device can display is narrower than the color space of an HDR content and hence the display device cannot properly reproduce and display the colors of the HDR content.

EIZO Corporation ("Product Information", [online], [searched on Aug. 31, 2015], the Internet <URL:http://www.eizo.co.jp/products/ce/cg3184k/index.html>) discloses a display device in which three-dimensional look-up table (hereinafter called "3D-LUT") data is installed, and which converts, in video images of the "Rec. 2020" color gamut of the 8K Super Hi-Vision broadcast, a color that cannot be reproduced by the "Rec. 709" color gamut of the current Full Hi-Vision broadcast into gray and displays it with a warning, or convers the color so that it falls within the Rec. 709 color gamut and displays it.

SUMMARY

As in the case of the display device according to the background art, the colors, the contrast, and the like of the display have been mainly controlled in the past. In the future, the brightness (luminance value) of the display will also be controlled so that the brightness of the display is changed according to the brightness at the time when a person actually sees the subject or according to the brightness at the time when the image of the subject is actually taken.

However, a display device in the past cannot determine whether or not an image can be displayed with brightness corresponding to respective luminance levels of input image data and cannot give, if necessary, a waning even when the brightness corresponding to the maximum luminance level is defined in the input image data.

Therefore, the present invention provides an image processing apparatus including: a first color gamut conversion unit that converts an input image signal in an XYZ color system into an output image signal in a linear RGB color system by using an inverse matrix of a matrix including, as its components, values obtained by normalizing XYZ values by a predetermined luminance value, the XYZ values being obtained by measuring an image for measurement displayed in a display device for which a determination is made; and a determination unit that determines, when an R, G, or B value of the output image signal is larger than a first predetermined value, that the display device cannot display an image related to the input image signal with brightness corresponding to respective luminance of the input image signal.

Further, the present invention provides a display determination method using a matrix including, as its components, values obtained by normalizing XYZ values by a predetermined luminance value, the XYZ values being obtained by measuring an image for measurement displayed in a display device for which a determination is made, the display determination method including: converting an input image signal in an XYZ color system into an output image signal in a linear RGB color system by using an inverse matrix of the matrix; and determining, when an R, G, or B value of the output image signal is larger than a first predetermined value, that the display device cannot display an image related to the input image signal with brightness corresponding to respective luminance of the input image signal.

According to an exemplary embodiment, it is possible to provide an image processing apparatus and a display determination method capable of determining whether or not a display device can display an image with brightness corresponding to respective luminance levels of input image data.

BRIEF DESCRIPTION OF THE DRAWINGS

The above and other aspects, advantages and features will be more apparent from the following description of certain embodiments taken in conjunction with the accompanying drawings, in which:

FIG. 3 is a diagram for explaining an operation of a color gamut conversion unit 20 according to an exemplary embodiment;

DETAILED DESCRIPTION

An image processing apparatus according to an exemplary embodiment is explained hereinafter with reference to the drawings. An image processing apparatus according to this exemplary embodiment determines whether a display device can display an image related to input image data with luminance or a color corresponding to the input image data, i.e., with luminance or a color intended in the image related to the input image data and displays a warning when the display device cannot display the image with luminance or a color corresponding to the input image data.

Note that the term "images" used in this specification includes "still images" and "moving images (video images)".

Firstly, a configuration of an image processing apparatus according to this exemplary embodiment is explained.

Figure 1:
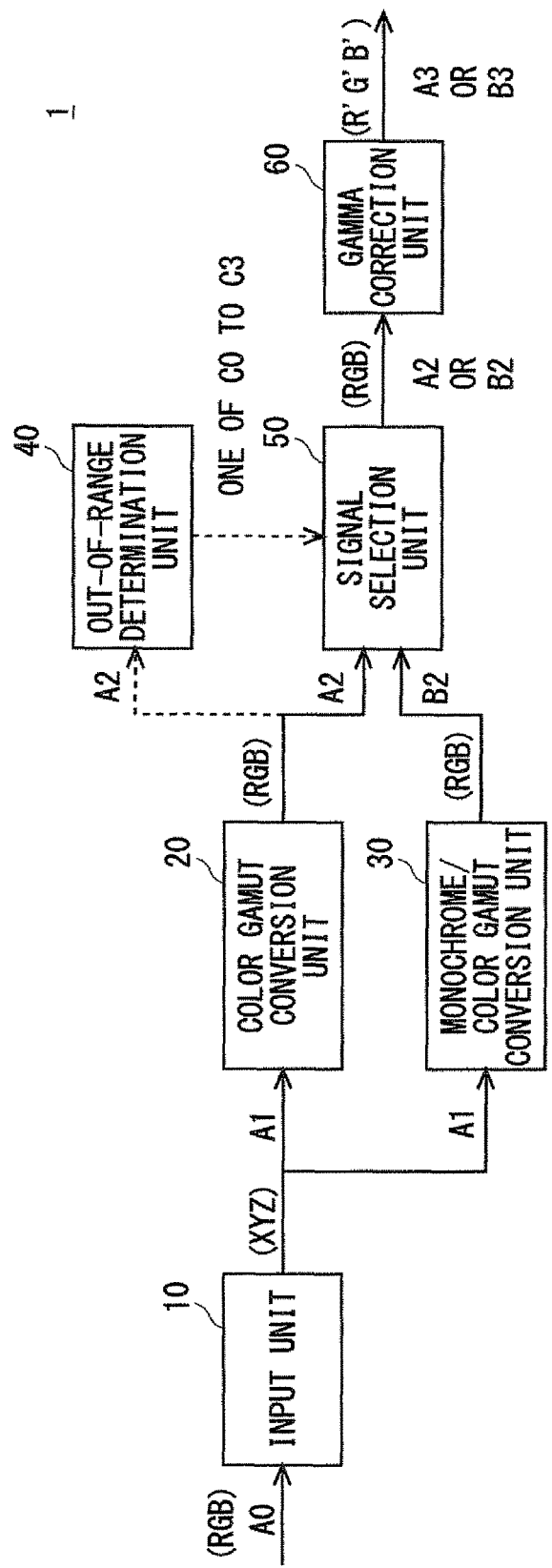
FIG. 1 is a block diagram showing a general configuration of an image processing apparatus 1 according to an exemplary embodiment.

FIG. 1 is a block diagram showing a general configuration of an image processing apparatus 1 according to this exemplary embodiment.

The image processing apparatus 1 includes an input unit 10, a color gamut conversion unit 20, a monochrome/color gamut conversion unit 30, an out-of-range determination unit 40, a signal selection unit 50, a gamma correction unit 60, and so on. The image processing apparatus 1 may also serves as a display device (not shown) or may be provided separately from the display device.

The input unit 10 receives an image signal A0, converts its color system, for example, an RGB color system, which is a relative color space, into an XYZ color system, which is an absolute color space, thereby generates an image signal A1 in the XYZ color system, and outputs the generated image signal A1 to the color gamut conversion unit 20 and the monochrome/color gamut conversion unit 30.

The color gamut conversion unit 20 stores a 3×3 matrix M, generates a color image signal A2 in a linear RGB color system by performing a linear transformation (or a linear conversion) on the image signal A1 in the XYZ color system by using the inverse matrix of the matrix M, and outputs the generated color image signal A2 to the out-of-range determination unit 40 and the signal selection unit 50. Note that the color gamut conversion unit 20 may store the inverse matrix of the matrix M.

The monochrome/color gamut conversion unit 30 stores a 3×3 matrix M, generates a monochrome image signal B1 in the XYZ color system by performing a monochrome conversion on the image signal A1 in the XYZ color system, generates a monochrome image signal B2 in the linear RGB color system by performing a linear transformation on the monochrome image signal B1 by using the inverse matrix of the matrix M, and outputs the generated monochrome image signal B2 to the signal selection unit 50.

The out-of-range determination unit 40 determines whether a display device can display an image related to the image signal A0 with luminance and colors respectively corresponding to the image signal A0 based on the R, G, and B values of the color image signal A2 and outputs determination signals C0 to C3 to the signal selection unit 50. Details of the determination signals C0 to C3 are described later.

The signal selection unit 50 selects the color image signal A2 or the monochrome image signal B2 for each pixel of the image related to the image signal A0 based on the determination signals C0 to C3 and outputs the selected image signal to the gamma correction unit 60. Further, when the signal selection unit 50 outputs the color image signal A2, the signal selection unit 50 limits (clips) the image signal to 0.0 when its R, G, or B value is smaller than 0.0 and limits the image signal to 1.0 when the R, G, or B value is larger than 1.0. Then, the signal selection unit 50 outputs the limited image signal.

The gamma correction unit 60 performs a gamma correction on the color image signal A2 or the monochrome image signal B2 in the linear RGB color system so that its gamma characteristic conforms to that of the display device, and thereby outputs a color image signal A3 or a monochrome image signal B3 to the display device.

Note that each component of the image processing apparatus 1 can be implemented by, for example, executing a program under the control of an arithmetic device (not shown) included in the image processing apparatus 1. More specifically, the image processing apparatus 1 implements each component thereof by loading a program stored in a storage unit (not shown) into a main storage device (not shown) and executing the program under the control of the arithmetic device. Further, each component does not necessarily have to be implemented by software by using a program. That is, each component may be implemented by any combination of hardware, firmware, software, and the like.

The above-described program can be stored in various types of non-transitory computer readable media and thereby supplied to the image processing apparatus 1. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to the image processing apparatus 1 by using various types of transitory computer readable media. Examples of the transitory computer readable media include an electrical signal, an optical signal, and an electromagnetic wave. The transitory computer readable media can be used to supply programs to the image processing apparatus 1 through a wire communication path such as an electrical wire and an optical fiber, or a wireless communication path.

Next, an operation of the image processing apparatus 1 according to this exemplary embodiment, i.e., an image processing method is explained.

Figure 2:
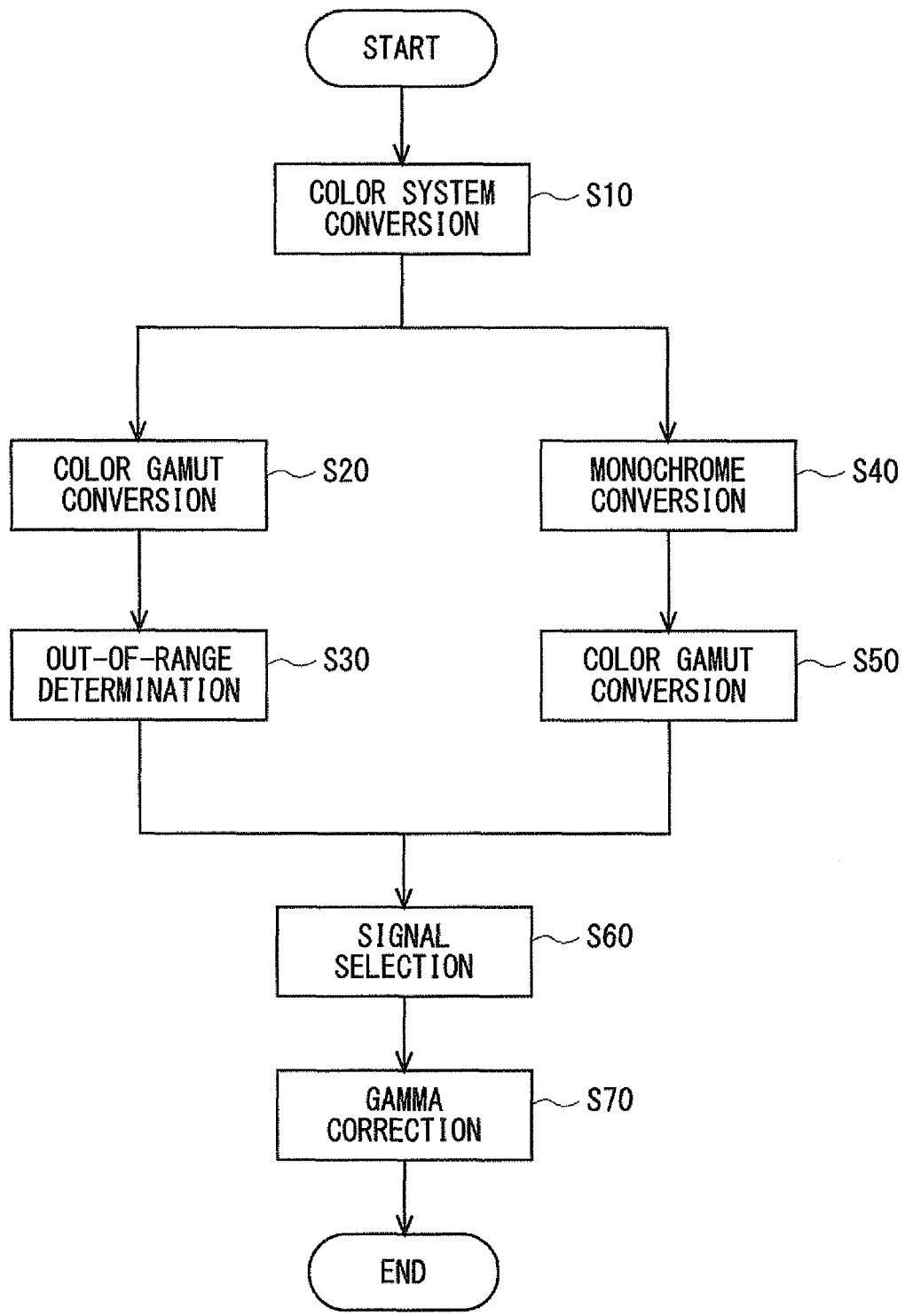
FIG. 2 is a flowchart showing a processing procedure of an image processing method according to an exemplary embodiment.

FIG. 2 is a flowchart showing a processing procedure of an image processing method according to this exemplary embodiment.

When the image processing apparatus 1 starts its operation, the input unit 10 converts an image signal A0 into an image signal in an XYZ color system and thereby generates an image signal A1 (step S10).

Next, the color gamut conversion unit 20 performs a linear transformation (or a linear conversion) on the image signal A1 in the XYZ color system by using the inverse matrix of the matrix M and thereby generates an color image signal A2 in a linear RGB color system (step S20).

FIG. 3 is a diagram for explaining an operation of the color gamut conversion unit 20 according to this exemplary embodiment.

The matrix M, which is used for the linear transformation, is calculated as shown below.

Firstly, a 3×3 matrix M0 including, as its components, XYZ values obtained by performing XYZ measurement (tristimulus value measurement) on each of RGB outputs displayed in a display device is calculated. The display luminance in this process may have arbitrary values.

$$M0 = \begin{pmatrix} R_x & R_y & R_z \\ G_x & G_y & G_z \\ B_x & B_y & B_z \end{pmatrix}$$ [Expression 1]

Note that measurement values X, Y and Z at the time when R (Red) is displayed in the display device are used as the components $R_x$, $R_y$ and $R_z$ of the matrix M0. Measurement values X, Y and Z when G (Green) is displayed in the display device are used as the components $G_x$, $G_y$ and $G_z$ of the matrix M0. Further, measurement values X, Y and Z when B (Blue) is displayed in the display device are used as the components Bx, By and Bz of the matrix M0. Note that in order to determine the components of the matrix M0, Rx, Ry and Rz may be measured by using a filter-type sensor or a spectrum-type sensor while displaying white light.

Then, a 3×3 matrix M is calculated by normalizing the matrix M0 by using luminance Yw (=Ry+Gy+By) at a white point in the display device, and a ratio YwR between the maximum luminance value of a white point in the display device (e.g., 1,000 [cd/m²]) and the maximum luminance value of a white point in the input image signal A0 (e.g., 10,000 [cd/m²]). Here, the matrix M can be expressed by the below-shown expression.

$$M = M0 \times 1/(Yw \times YwR) \quad \text{[Expression 2]}$$

$$= \begin{pmatrix} R_x/Yw \times YwR & R_y/Yw \times YwR & R_z/Yw \times YwR \\ G_x/Yw \times YwR & G_y/Yw \times YwR & G_z/Yw \times YwR \\ B_x/Yw \times YwR & B_y/Yw \times YwR & B_z/Yw \times YwR \end{pmatrix}$$

For example, in the video standard "SMPTE ST 2084" having a wide dynamic range proposed by the SMPTE (Society of Motion Picture & Television Engineers), the maximum luminance value of a white point is specified as 10,000 [cd/m²]. Therefore, when an image in conformity to the SMPTE ST 2084 is input, the maximum luminance value of a white point in the input image signal A0 is set to 10,000 [cd/m²].

Then, the color gamut conversion unit 20 performs a linear transformation on the image signal A1 by using the inverse matrix of the matrix M and thereby generates a color image signal A2. When the XYZ values of the image signal A1 are represented by X1, Y1 and Z1, the liner RGB values of the color image signal A2 after the color gamut conversion is performed is calculated by the below-shown Expression (1).

[Expression 3]

$$\begin{pmatrix} R \\ G \\ B \end{pmatrix} = M^{-1} \begin{pmatrix} X1 \\ Y1 \\ Z1 \end{pmatrix} \quad (1)$$

Since the color gamut conversion unit 20 performs a linear transformation for each pixel by using the inverse matrix of the 3×3 matrix M, the color gamut conversion unit 20 can ensure the maximum conversion accuracy. Further, since there is no need to perform interpolation calculation, which is necessary when the 3D-LUT method is used, the processing time is short. Further, since the image signal A1 is an image signal in the CIE XYZ format and hence in the absolute color space, only one transformation parameter (the inverse matrix of the matrix M) is required. Further, unlike when the 3D-LUT method is used, there is no need to prepare LUT data for each input signal standard.

Further, since the color gamut conversion unit 20 performs signed fixed-point calculation or floating-point calculation using the inverse matrix of the matrix M, values after the linear transformation can be values outside the range of the video output values (when normalized by the maximum value, smaller than zero or no smaller than one). Signals that are outside of the range after the transformation are synonymous with luminance or colors that cannot be displayed by the display device. Therefore, it is possible to easily determine whether luminance and colors fall within the displayable range or outside thereof based on the matrix calculation result.

Next, the out-of-range determination unit 40 compares, for each pixel of the image related to the image signal A0, the R, G and B values of the color image signal A2 with threshold values 0 and 1, thereby determines whether or not the display device can display that pixel with the luminance and the color corresponding to the image signal (input image data) A0, and outputs determination signals C0 to C3 (step S30).

Figure 4A:
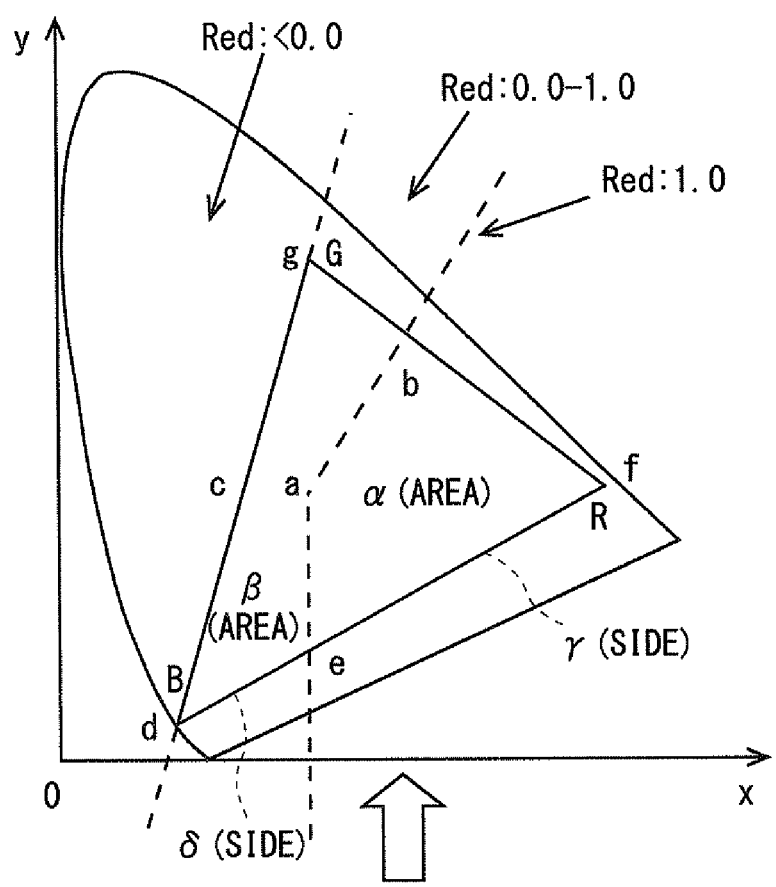
FIG. 4A shows coordinate systems for explaining an out-of-range determination according to an exemplary embodiment.
Figure 4B:
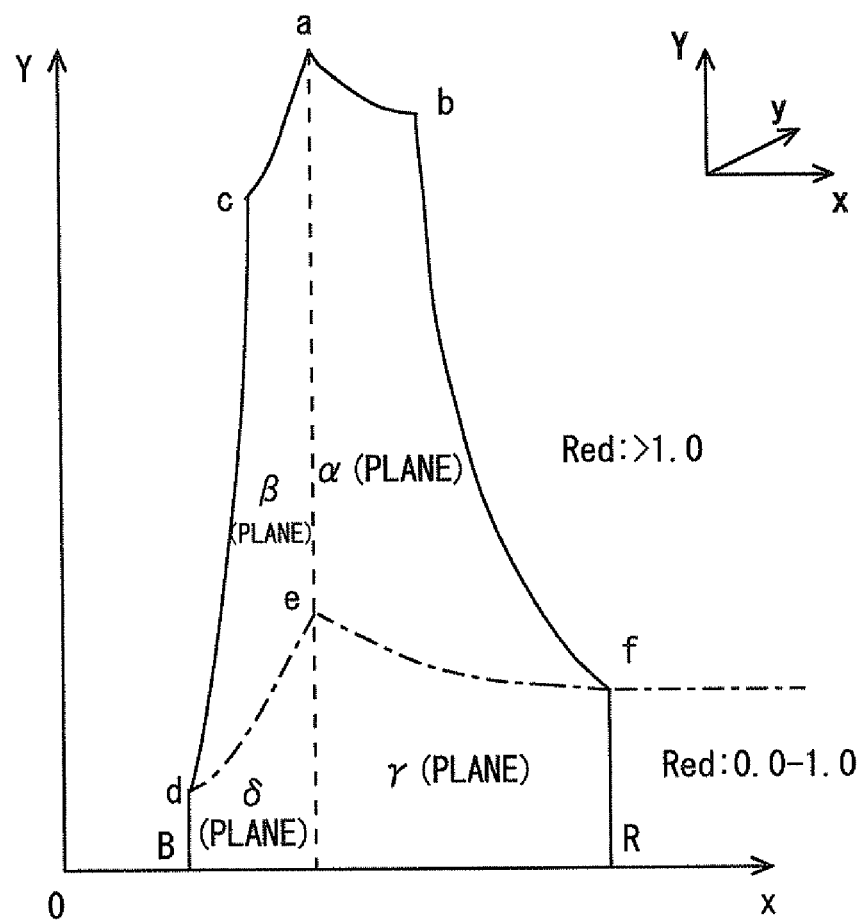
FIG. 4B shows coordinate systems for explaining an out-of-range determination according to an exemplary embodiment.

FIG. 4 shows coordinate systems for explaining an out-of-range determination according to this exemplary embodiment. FIG. 4A is a related-art xy chromaticity diagram and FIG. 4B is a coordinate system that is obtained by newly adding a Y (luminance) axis in the xy chromaticity diagram and viewing it in the same direction as the direction of the arrow shown in FIG. 4A. These figures both show an example where attention is paid to the R signal and the area is divided according to the R signal value.

In FIG. 4, coordinates "a" indicate white (1, 1, 1); coordinates "b" indicate yellow (1, 1, 0); coordinates "c" indicate cyan (0, 1, 1); coordinates "d" indicate blue (0, 0, 1); coordinates "e" indicate magenta (1, 0, 1); coordinates "f" indicate red (1, 0, 0); and coordinates "g" indicate green (0, 1, 0).

In the related-art xy chromaticity diagram shown in FIG. 4A, only values smaller than zero, or values no smaller than 0.0 and no larger than 1.0 can be expressed for each of the RGB signals. Therefore, it can be used only for the out-of-range determination for the display colors. In this example, an area α inside a polygon formed by connecting points a, e, f and b is a range corresponding to R=1, and an area β inside a polygon formed by connecting points a, b, g, c, d and e is a range corresponding to 0≤R≤1.

In contrast to this, in the coordinate system shown in FIG. 4B, which is obtained by newly adding the Y axis in the xy chromaticity diagram shown in FIG. 4A, any possible RGB signal can be expressed and hence can be used for the out-of-range determination for both the brightness and the color of the display. In this example, a three-dimensional part (not shown) positioned beyond the planes γ and δ is a range corresponding to 0≤R≤1 and a three-dimensional part (not shown) positioned beyond the planes α and β is a range corresponding to 1<R.

Therefore, when at least one of the R, G and B values of the color image signal A2 is larger than the boundary plane (R, G or B=1), the out-of-range determination unit 40 determines that the brightness of that pixel is outside the display range.

Table 1 shows determinations made by the out-of-range determination unit 40 and types of determination signals output by the out-of-range determination unit 40.

TABLE 1

| RGB values of image signal A2 | Determination | Determination signal |
|---|---|---|
| 0 ≤ R, G and B ≤ 1 | Luminance and color are both OK | C0 |
| R, G or B < 0 | Luminance is OK and color is NG | C1 |
| 1 < R, G or B | Luminance is NG and color is OK | C2 |
| (R, G or B < 0) and (1 < R, G or B) | Luminance and color are both NG | C3 |

For example, when the R, G and B values of a given pixel in the color image signal A2 are no smaller than zero and no larger than one, the out-of-range determination unit 40 determines that both the luminance and the color are within the displayable range and outputs a determination signal C0 for that pixel.

Further, when the R and G values of a given pixel are no smaller than zero and no larger than one, and the B value thereof is smaller than zero, the out-of-range determination unit 40 determines that the luminance is within the displayable range but the color is outside the displayable range, and outputs a determination signal C1 for that pixel.

Further, when the B value of a given pixel is smaller than zero and the G value thereof is larger than one, the out-of-range determination unit 40 determines that both the luminance and the color are outside the displayable range and outputs a determination signal C3 for that pixel.

Meanwhile, the monochrome/color gamut conversion unit 30 performs a monochrome conversion and a color gamut conversion on the image signal A1.

Figure 5:
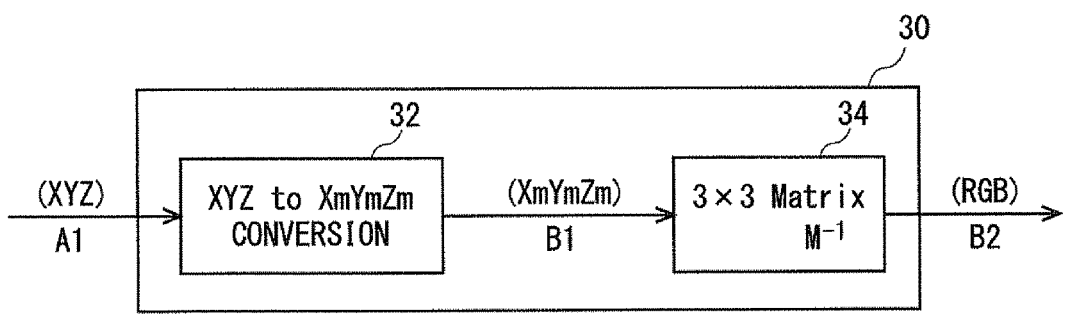
FIG. 5 is a diagram for explaining an operation of a monochrome/color gamut conversion unit 30 according to an exemplary embodiment.

FIG. 5 is a diagram for explaining an operation of the monochrome/color gamut conversion unit 30 according to this exemplary embodiment.

Firstly, a monochrome conversion unit 32 performs an X'Y'Z' transformation (or an X'Y'Z' conversion) on the image signal A1 in the XYZ color system by using the Y value of the image signal A1 as shown by the below-shown Expression (2) and thereby generates a monochrome image signal B1 in the XYZ color system (step S40).

$$Xm = Xw \times Y$$

$$Ym = Yw \times Y$$

$$Zm = Zw \times Y \qquad (2)$$

Here, regarding coefficients Xw, Yw and Zw, the coefficient Yw is fixed to 1.0 and the coefficients Xw and Zw are set with predefined ratios. By fixing the coefficient Yw to 1.0, it is possible to conform the luminance of the input image signal A1 and that of the monochrome image signal B1 to each other and thereby to maintain the maximum luminance of the image signal A1 even after the monochrome conversion is performed.

The monochrome conversion unit 32 can generate a monochrome image having an arbitrary color temperature (warm color, cold color, neutral color, and so on) by using the coefficients Xw, Yw and Zw. Further, since the Y value is used as the reference value for the conversion, the monochrome image can be converted with accurate brightness regardless of what kind of the color shade the monochrome image has.

In this example, the monochrome conversion unit 32 generates three types (three colors, i.e., green, yellow, red) of monochrome image signals B1 from the image signal A1.

Next, a color gamut conversion unit 34 performs a color gamut transformation (or a color gamut conversion) on the monochrome image signal B1 by using the inverse matrix of the 3×3 matrix M and thereby generates three types of monochrome image signals B2 in a linear RGB color system (step S50). The matrix M used in the color gamut conversion unit 34 is the same matrix as the matrix M used in the color gamut conversion unit 20. Therefore, the color gamut conversion unit 20 can also serve as the color gamut conversion unit 34.

Next, the signal selection unit 50 selects either the color image signal A2 or one of the three types of monochrome image signals B2 for each pixel of the input image related to the image signal A0 based on the determination signals C0 to C3 (step S60).

Next, the gamma correction unit 60 performs a gamma correction on the color image signal A2 and the monochrome image signal B2 in the linear RGB color system so that their gamma characteristics conform to the gamma characteristic of the display device (step S70).

After that, the display device performs necessary image processing on the color image signal A3 or the monochrome image signal B3 and displays images on its screen.

Figure 6:
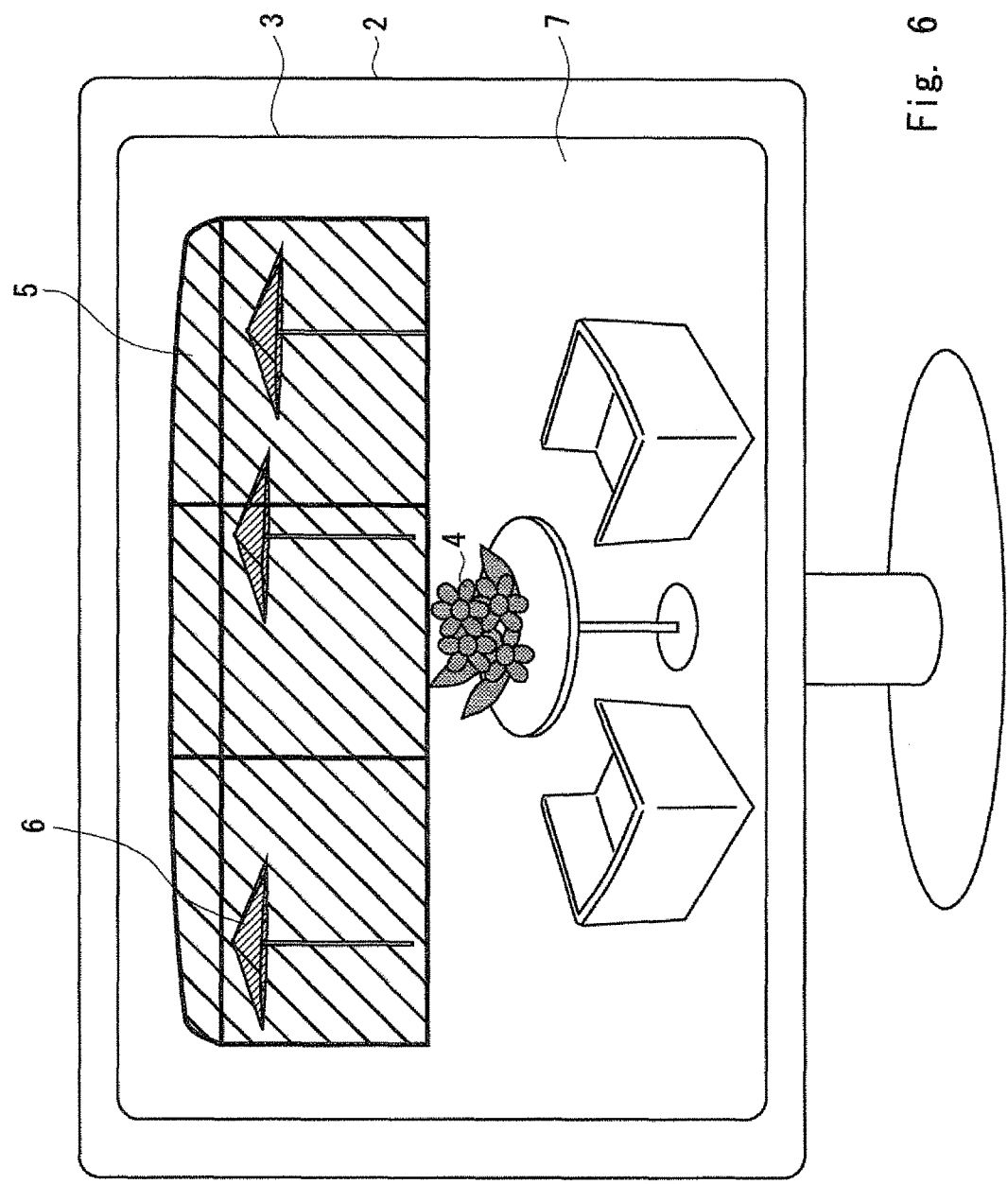
FIG. 6 shows a display state of a display device 2 according to an exemplary embodiment.

FIG. 6 shows a display state of a display device 2 according to this exemplary embodiment. On the screen 3 of the display device 2, an image of the interior of a room and scenery outside a window is displayed.

A flower 4 is placed on a desk just below the center of the screen 3. However, since the color of the flower 4 in the image signal A0 (or the image signal A2) is outside the displayable range of the display device 2, the determination signal of the out-of-range determination unit 40 becomes the signal C1 and hence the area of the flower 4 is displayed in monochrome (green).

Further, there is scenery (sky 5) outside the window in the horizontal direction near the center of the screen 3. However, since the luminance of the sky 5 in the image signal A0 is outside the displayable range of the display device 2, the determination signal becomes the signal C2 and hence the area of the sky 5 is displayed in monochrome (yellow).

Further, there is scenery (parasols 6) outside the window in the horizontal direction near the center of the screen 3. However, since both the luminance and the color of the parasols 6 in the image signal A0 are outside the displayable range of the display device 2, the determination signal becomes the signal C3 and hence the areas of the parasols 6 are displayed in monochrome (red).

Further, the interior 7 of the room is displayed over the entire area of the screen 3. However, since both the luminance and the color of the interior 7 (except for the flower) of the room in the image signal A0 are within the displayable range of the display device 2, the determination signal becomes the signal C0 and hence the area of the interior 7 (except for the flower) of the room is displayed in color.

As described above, according to the image processing apparatus or the image processing method in accordance with this exemplary embodiment, it is possible to check whether or not the luminance or the color of the input image can be displayed by the display device 2 at first sight.

Note that in the image processing apparatus or the image processing method according to the exemplary embodiment, the R, G and B values of the color image signal A2 are compared with the threshold values 0 and 1, and it is determined whether or not the display device 2 can display the image with the luminance and the color corresponding to the image signal A0. However, when the values of the color image signal A2 change in the color gamut conversion unit 20, the out-of-range determination unit 40, and the like, predetermined first and second threshold values may be used, instead of using the threshold values 0 and 1. That is, the R, G and B values of the color image signal A2 may be compared with the first and second threshold values and it may be determined whether or not the display device 2 can display the image with the luminance and the color corresponding to the image signal A0.

Further, in the image processing apparatus or the image processing method according to the exemplary embodiment, the matrix M is calculated by normalizing the matrix M0 by using the luminance Yw at a white point in the display device and the ratio YwR between the maximum luminance value of a white point in the display device and the maximum luminance value of a white point in the input image signal A0. Meanwhile, when CG (Computer Graphics) is displayed in the display device, the output code values of the image signal are specified by brightness based on brightness defined in CG creation software or the like. Therefore, the matric M may be calculated by normalizing the matrix M0 by using this specified brightness value as the above-described maximum luminance value of the white point in the input image signal A0. As a result, it can be determined whether or not the display device can display the CG with the brightness intended at the time of the creation of the CG.

Further, by normalizing the matrix M0 by using an arbitrary luminance value as the above-described maximum luminance value of the white point in the input image signal A0, it is possible to determine whether or not the display device can display the brightness. For example, when the brightness (luminance) at the time when the image is taken is known by measuring the brightness at the time of the image-taking, it is possible to determine, by normalizing the matrix M0 using that brightness, whether the brightness at the time of the image-taking can be reproduced when the image is displayed in the display device.

Note that when the matrix M0 is normalized by using only the luminance Yw of the white point in the display device while not using the ratio YwR between the maximum luminance values, the determination on the brightness cannot be made, though the determination on the color can be made.

Further, in the image processing apparatus or the image processing method according to the exemplary embodiment, the color gamut conversion unit holds one matrix M and performs a color gamut conversion by using the one matrix M. However, the color gamut conversion unit may prepare and hold one matrix M for each of all the luminance levels (0 to 255) of the input image signal A0 or each of all the luminance levels within a predetermined range of the input image signal A0.

Figure 7:
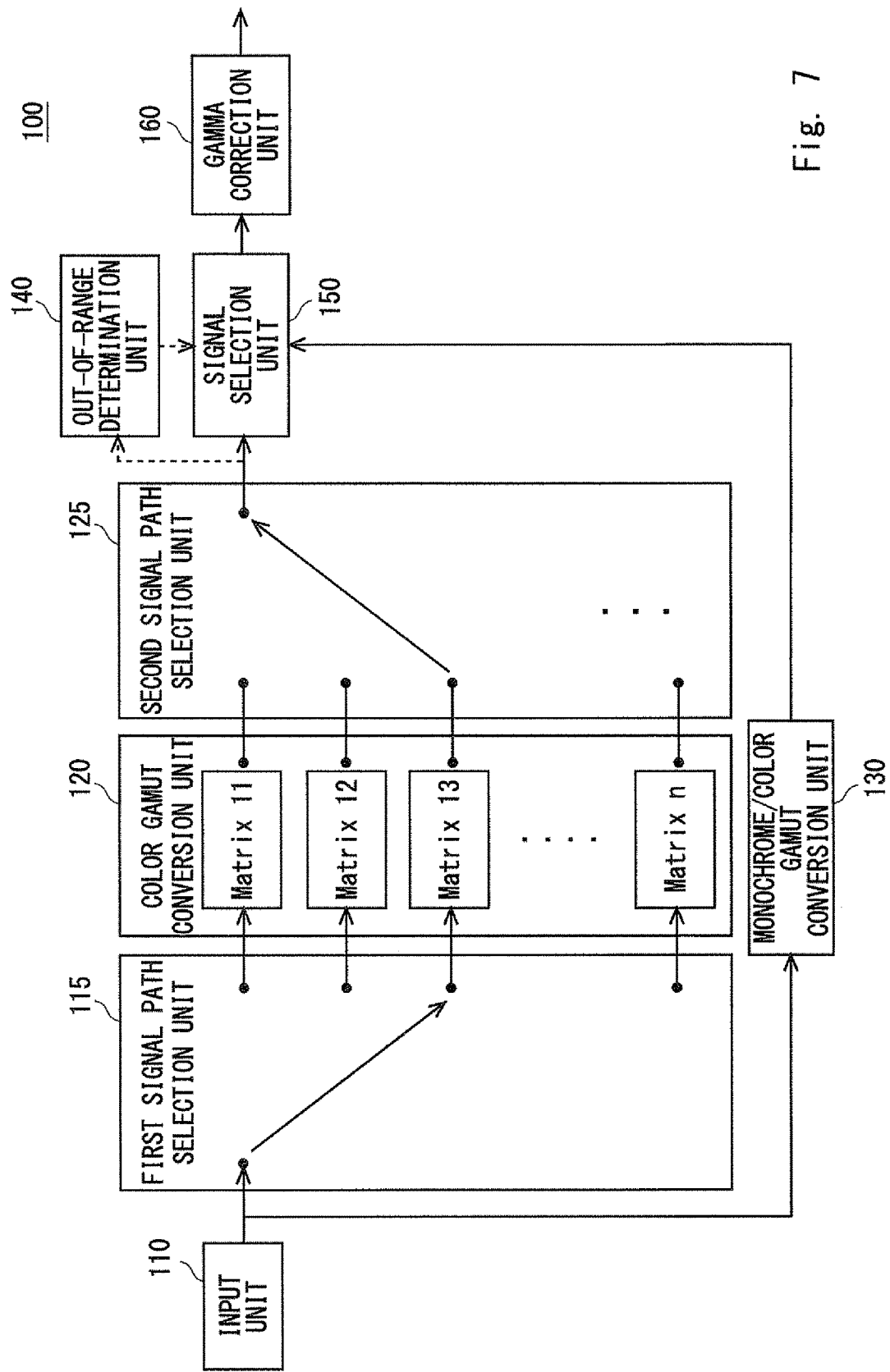
FIG. 7 is a block diagram showing a general configuration of an image processing apparatus 100 according to another exemplary embodiment.

FIG. 7 is a block diagram showing a general configuration of an image processing apparatus 100 according to another exemplary embodiment.

Unlike the image processing apparatus 1, the image processing apparatus 100 includes a first signal path selection unit 115 disposed between an input unit 110 and a color gamut conversion unit 120. Further, the image processing apparatus 100 also includes a second signal path selection unit 125 disposed between the color gamut conversion unit 120 and an out-of-range determination unit 140 or a signal selection unit 150. Further, the color gamut conversion unit 120 has a plurality of matrixes M11, M12, . . . , Mn.

The first signal path selection unit 115 selects a matrix M corresponding to the luminance level of the image signal A1. For example, in the case of an 8-bit signal (0 to 255), the first signal path selection unit 115 selects the matrix M11 when the luminance level is between 0 and 15 and selects the matrix M12 when the luminance level is between 16 and 64. Further, the first signal path selection unit 115 selects the matrix Mn when the luminance level is between 240 and 255.

Further, the first signal path selection unit 115 selects an arbitrary matrix M, for example, the matrix Mn corresponding to the maximum value (255) when only one path is required.

Further, the matrix M11, which is used when the luminance level of the input signal is between 0 and 15, is calculated by normalizing a matrix M0 that is obtained by performing XYZ measurement on the RGB outputs of the display device when the luminance level of the input signal is 8, which is roughly the center value between 0 and 15, by using the luminance Yw at a white point in the display device and the ratio YwR between the maximum luminance value of a white point in the display device and the maximum luminance value of a white point in the input image signal A0.

Similarly, the matrix M12, which is used when the luminance level of the input signal is between 16 and 64, is calculated by normalizing a matrix M0 that is obtained by performing XYZ measurement on the RGB outputs when the luminance level of the input signal is 40, which is roughly the center value between 16 and 64.

As shown in FIG. 4B, the displayable color gamut of a display device such as a liquid-crystal display device (LCD) changes according to the luminance level. That is, the ratio among Rx, Ry and Rz or the like of such a display device changes. Therefore, it is possible to make a display determination of the brightness and the color more accurately by holding a plurality of matrixes M corresponding to respective luminance levels of the input image signal.

Further, by inputting an image signal having the maximum luminance level to the display device and displaying the image signal in the display device, a matrix M may be calculated with XYZ values obtained by the XYZ measurement. By using this matrix M, it may be determined whether or not the luminance or the color is within its displayable range of the display device for all the luminance levels of the input signal. For example, the displayable color gamut of a display device such as an organic electroluminescence display device (OLED) does not change according to the luminance level. That is, the ratio among Rx, Ry and Rz or the like of such a display device does not change. Therefore, it is possible to determine whether or not the luminance or the color of an input image signal is within the displayable range of the display device by using one matrix M.

Further, the display device may prepare and hold a matrix (or matrixes) M according to its components such as a backlight and a lamp.

Further, in the image processing apparatus or the image processing method according to the exemplary embodiment, the color gamut conversion unit 20 stores the matrix M in advance. However, the color gamut conversion unit 20 may calculate the matrix M every time the display device displays an image or calculate it at predetermined timings. For example, the above-described matrix M0 may be stored in a storage unit (not shown) in advance. Then, an arithmetic device (not shown) may calculate the matrix M by normalizing the matrix M0 by using luminance information contained in the image signal A0 as described above and the color gamut conversion unit 20 may perform a color gamut conversion by using the calculated matrix M. In this way, it is possible to make a display determination more accurately. For example, in the case of an image in conformity to the above-described SMPTE ST 2084, luminance values are associated with its output code values, thus making the above-described method feasible.

Further, in the case of a display device whose display characteristic significantly changes over time, it is possible to make a more accurate display determination regardless of the change of the display device over time by performing the XYZ measurement and thereby calculating the matrix M at predetermined intervals.

Further, in the image processing apparatus or the image processing method according to the exemplary embodiment, an image is displayed in color when the brightness or the color in the input signal is within the display range and is displayed in monochrome for a warning purpose when the brightness or the color is outside the display range. However, an image may be displayed in monochrome when the brightness or the color is within the display range and displayed in color when the brightness or the color is outside the display range. Further, the monochrome display does not necessarily have to be performed with three colors. That is, it may be performed with only one color. In this case, only the two types of determination signals, i.e., the determination signals C0 and C1 are used.

Further, in the image processing apparatus or the image processing method according to the exemplary embodiment, an image is displayed in color or in monochrome according to the determination signal when a display determination is made. However, in the case where no display determination is made, i.e., an image is displayed in an ordinary manner, the image may be displayed as it is when the brightness or the color of the input signal is within its display range and a signal clipped in the signal selection unit 50 may be displayed when the brightness or the color is outside the display range.

Further, the image processing apparatus or the image processing method according to the exemplary embodiment may be configured as an image processing apparatus or an image processing method for performing a color gamut conversion and an out-of-range determination.

As described above, the image processing apparatus 1 according to the exemplary embodiment includes the first color gamut conversion unit 20 that converts an input image signal A1 in an XYZ color system into an output image signal A2 in a linear RGB color system by using the inverse matrix of a matrix M including, as its components, values obtained by normalizing XYZ values, which are obtained by measuring an image for measurement displayed in the display device 2 for which a determination is made, by a predetermined luminance value, and the determination unit 40 that determines, when the R, G, or B value of the output image signal A2 is larger than the first predetermined value, that the display device 2 cannot display an image related to the input image signal A1 with brightness corresponding to respective luminance of the input image signal A1.

Further, in the image processing apparatus 1 according to the exemplary embodiment, the determination unit 40 preferably further determines, when the R, G, or B value of the output image signal A2 is smaller than the second predetermined value, that the display device 2 cannot display the image related to the input image signal A1 with colors corresponding to respective colors of the input image signal A1.

Further, in the image processing apparatus 1 according to the exemplary embodiment, the predetermined luminance value is preferably a luminance value contained in luminance information contained in the input image signal A1.

Further, the image processing apparatus 1 according to the exemplary embodiment preferably further includes a storage unit that stores the XYZ values and a matrix calculation unit that acquires the predetermined luminance value and calculates a matrix at a predetermined timing.

Further, in the image processing apparatus 1 according to the exemplary embodiment, the predetermined luminance value is preferably a luminance value having the maximum luminance level of the input image signal A1.

Further, in the image processing apparatus 1 according to the exemplary embodiment, the predetermined luminance value is preferably a luminance value at the time when the image related to the input image signal A1 is taken.

Further, in the image processing apparatus 1 according to the exemplary embodiment, the matrix M preferably includes matrixes M11 to Mn prepared for respective luminance values of the input image signal or for respective luminance values in a predetermined range of the input image signal.

Further, the image processing apparatus 1 according to the exemplary embodiment preferably further includes the monochrome/color gamut conversion unit 30 and the selection unit 50. The monochrome/color gamut conversion unit 30 preferably includes a monochrome conversion unit 32 that performs a monochrome conversion on the input image signal A1 and outputs an input monochrome image signal B1 in an XYZ color system, and a second color gamut conversion unit 34 that converts the input monochrome image signal B1 into an output monochrome image signal B2 in a linear RGB color system by using the inverse matrix of the matrix M. The selection unit 50 preferably outputs one of the output image signal A2 and the monochrome image signal B2 for a pixel which the determination unit 40 determines that the display device 2 cannot display with brightness or colors corresponding to respective luminance or respective colors of the input image signal A1 and outputs the other of the output image signal A2 and the monochrome image signal B2 for a pixel which the determination unit 40 determines that the display device 2 can display with brightness or colors corresponding to respective luminance or respective colors of the input image signal A1.

Further, a display determination method according to an exemplary embodiment is a display determination method using a matrix M including, as its components, values obtained by normalizing XYZ values, which are obtained by measuring an image for measurement displayed in a display device for which a determination is made, by a predetermined luminance value. The display determination method includes a step S20 of converting an input image signal A1 in an XYZ color system into an output image signal A2 in a linear RGB color system by using the inverse matrix of the matrix M, and a step S30 of determining, when the R, G, or B value of the output image signal A2 is larger than the first predetermined value, that the display device 2 cannot display an image related to the input image signal A1 with brightness corresponding to respective luminance of the input image signal A1.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image processing apparatus comprising:
a first color gamut conversion unit configured to convert an input image signal in an XYZ color system into an output image signal in a linear RGB color system by using an inverse matrix of a matrix including, as its components, values obtained by normalizing XYZ values by a predetermined luminance value, the XYZ values being obtained by measuring an image for measurement displayed in a display device for which a determination is made; and
a determination unit configured to determine, when an R, G, or B value of the output image signal is larger than a first predetermined value, that the display device cannot display an image related to the input image signal with brightness corresponding to respective luminance of the input image signal.

2. The image processing apparatus according to claim 1, wherein the determination unit further determines, when the R, G, or B value of the output image signal is smaller than a second predetermined value, that the display device cannot display the image related to the input image signal with colors corresponding to respective colors of the input image signal.

3. The image processing apparatus according to claim 1, wherein the predetermined luminance value is luminance information contained in the input image signal.

4. The image processing apparatus according to claim 1, further comprising:
 a storage unit configured to store the XYZ values; and
 a matrix calculation unit configured to acquire the predetermined luminance value and calculates the matrix at a predetermined timing.

5. The image processing apparatus according to claim 1, wherein the predetermined luminance value is a luminance value having a maximum luminance level of the input image signal.

6. The image processing apparatus according to claim 1, wherein the predetermined luminance value is a luminance value at the time when the image related to the input image signal is taken.

7. The image processing apparatus according to claim 1, wherein the matrix includes matrixes prepared for respective luminance values of the input image signal or for respective luminance values in a predetermined range of the input image signal.

8. The image processing apparatus according to claim 1, further comprising a monochrome/color gamut conversion unit and a selection unit, wherein
 the monochrome/color gamut conversion unit comprises:
 a monochrome conversion unit configured to perform a monochrome conversion on the input image signal and outputs an input monochrome image signal in an XYZ color system; and
 a second color gamut conversion unit configured to convert the input monochrome image signal into an output monochrome image signal in a linear RGB color system by using an inverse matrix of the matrix, and
 the selection unit outputs one of the output image signal and the monochrome image signal for a pixel which the determination unit determines that the display device cannot display with brightness or colors corresponding to respective luminance or respective colors of the input image signal and outputs the other of the output image signal and the monochrome image signal for a pixel which the determination unit determines that the display device can display with brightness or colors corresponding to respective luminance or respective colors of the input image signal.

9. A display determination method using a matrix including, as its components, values obtained by normalizing XYZ values by a predetermined luminance value, the XYZ values being obtained by measuring an image for measurement displayed in a display device for which a determination is made, the display determination method comprising:
 converting an input image signal in an XYZ color system into an output image signal in a linear RGB color system by using an inverse matrix of the matrix; and
 determining, when an R, G, or B value of the output image signal is larger than a first predetermined value, that the display device cannot display an image related to the input image signal with brightness corresponding to respective luminance of the input image signal.

10. An image processing apparatus comprising:
 a first color gamut converter that converts an input image signal in an XYZ color system into an output image signal in a linear RGB color system by using an inverse matrix of a matrix including, as its components, values obtained by normalizing XYZ values by a predetermined luminance value, the XYZ values being obtained by measuring an image for measurement displayed in a display device for which a determination is made; and
 a determiner that determines, when an R, G, or B value of the output image signal is larger than a first predetermined value, that the display device cannot display an image related to the input image signal with brightness corresponding to respective luminance of the input image signal.

* * * * *